United States Patent [19]

Niwa et al.

[11] Patent Number: 4,584,907

[45] Date of Patent: Apr. 29, 1986

[54] METHOD FOR CONTROLLING A RATE OF CHANGING AN RPM RATIO IN A CONTINUOUSLY VARIABLE TRANSMISSION

[75] Inventors: Takao Niwa; Takeshi Gono; Akinori Osanai, all of Susono, Japan

[73] Assignee: Toyota Jidosha Kabushiki Kaisha, Aichi, Japan

[21] Appl. No.: 611,358

[22] Filed: May 17, 1984

[30] Foreign Application Priority Data

May 20, 1983 [JP] Japan ................................. 58-87681

[51] Int. Cl.4 ...................... B60K 41/12; B60K 41/18
[52] U.S. Cl. .......................................... 74/866; 74/802
[58] Field of Search .................. 74/866, 865, 860, 864

[56] References Cited

U.S. PATENT DOCUMENTS 4,466,521 8/1984 Hattori et al. ................... 74/866 X
4,509,125 4/1985 Fattic et al. ...................... 74/866 X
4,522,086 6/1985 Haley ............................... 74/862 X

FOREIGN PATENT DOCUMENTS 3138584 4/1983 Fed. Rep. of Germany ........ 74/866

Primary Examiner—George H. Krizmanich
Assistant Examiner—D. Wright
Attorney, Agent, or Firm—Parkhurst & Oliff

[57] ABSTRACT

A method for controlling a continuously variable transmission installed in a vehicle. The method utilizes a changing rate for varying an RPM ratio between an output shaft and an input shaft to permit rapid acceleration of a vehicle when needed as well as fuel consumption efficiency. The rate of changing the RPM ratio is a function of the actual velocity of the vehicle and a difference between the desired RPM of a driving pulley and an actual RPM of a driving pulley.

14 Claims, 6 Drawing Figures

METHOD FOR CONTROLLING A RATE OF CHANGING AN RPM RATIO IN A CONTINUOUSLY VARIABLE TRANSMISSION

BACKGROUND OF THE INVENTION

The present invention relates to a method for controlling a continuously variable transmission installed in a vehicle and more particularly to a method for controlling a rate of changing a RPM ratio between a driving pulley and a driven pulley in a continuously variable transmission.

A major factor influencing the use of a continuously variable transmission in a vehicle is to decrease the amount of fuel consumed by the engine. The continuously variable transmission continuously varies a transmission RPM ratio "e" between a driving pulley and a driven pulley, i.e. (e=a rotating speed of an output shaft/a rotating speed of an input shaft, $RPM_{out}/RPM_{in}$). The transmission efficiency of a continuously variable transmission can be represented as a linearly declining function of the rate of changing the RPM ratio e, represented by ė. The rate of changing the RPM ratio (ė) is always referred to as a positive quantity, for example, the absolute value of the rate of change is referred to as $|\dot{e}|$ or $|de/dt|$.

In general, a requisite horsepower of an engine is typically a function of the amount that a throttle valve is opened. Additionally, a desired engine speed $RPM_e'$ is determined to have a value corresponding to a minimum amount of fuel consumption when the requisite horsepower for the engine has been determined. The RPM ratio e of the continuously variable transmission is controlled in such a manner that the actual engine rotation speed $RPM_e$ approaches the desired engine rotating speed $RPM_e'$.

Previous attempts to control the rate of changing the transmission RPM ratio have involved utilizing a fixed rate of changing the transmission ratio, which was completely independent of the amount that throttle valve was opening ($\theta$) or closing, i.e. $|d\theta/dt|$. Therefore, if the rate of changing the transmission RPM ratio was fixed at a high value, whenever rapid acceleration of the vehicle was required, the transmission could rapidly respond. However, a large amount of fuel was consumed whenever the vehicle was exposed to steady state driving conditions or when required to slowly accelerate. Conversely, if the rate of changing the transmission RPM ratio was fixed at a small value, only a small amount of fuel was consumed whenever the vehicle was exposed to steady state driving conditions or when slowly accelerating. However, the transmission could not rapidly respond when a rapid acceleration of the vehicle was required.

SUMMARY OF THE INVENTION

The present invention was made in view of the foregoing background and to overcome the foregoing drawbacks. It is accordingly an object of this invention to provide a method for controlling a continuously variable transmission which provides for an increased fuel consumption whenever rapid acceleration is required and causes a rate of changing the transmission ratio to increase.

To attain the above objects, a method for controlling a continuously variable transmission having a driving pulley, a driven pulley and a continuous belt member spanning the pulleys includes utilizing a changing rate of varying a RPM ratio between the driven pulley and the driving pulley in accordance with a difference between a desired engine rotating speed ($RPM_e'$) and an actual engine rotating speed ($RPM_e$) and an actual velocity of a vehicle.

BRIEF DESCRIPTION OF THE DRAWINGS

The above objects, features and advantages of the present invention will become more apparent from the following description of the preferred embodiments taken in conjunction with the accompanying drawings, wherein.

DETAILED DESCRIPTION OF THE PREFERRED EMBODIMENTS

The present invention is described in detail with reference to the accompanying drawings which illustrate different embodiments of the present invention.

Figure 1:
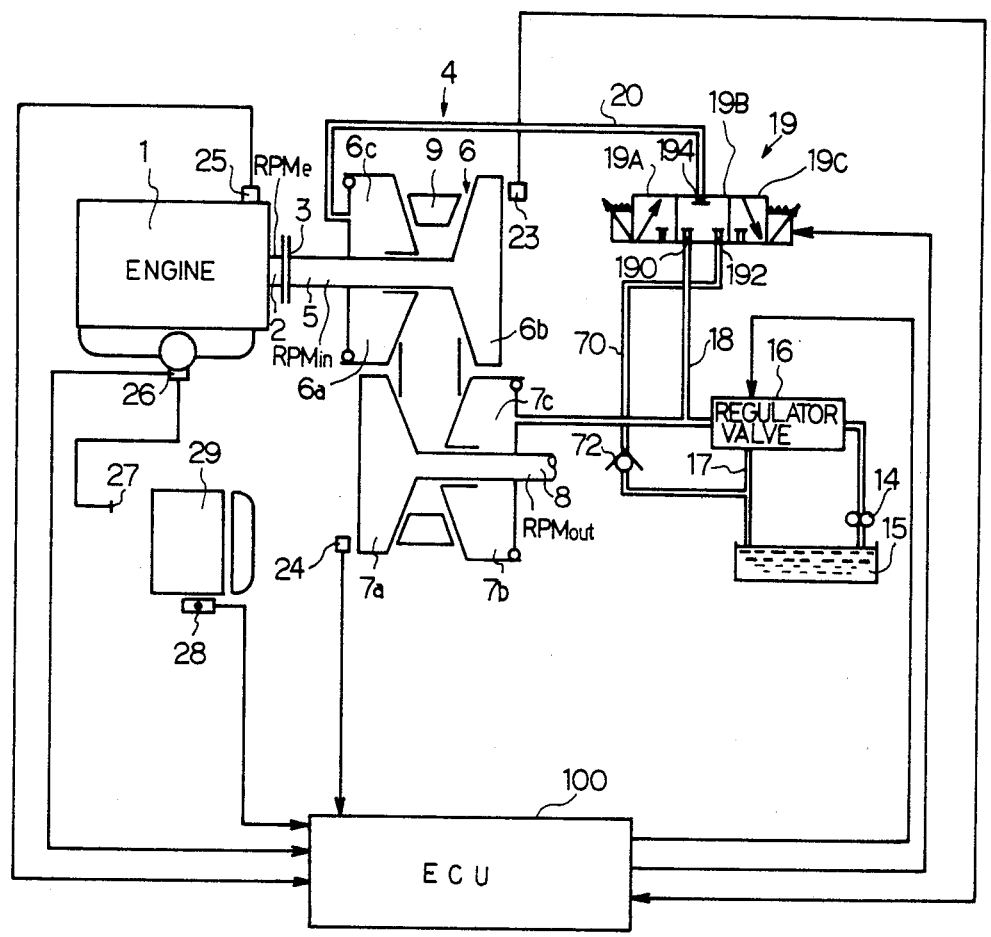
FIG. 1 is a schematic view of a hydraulic apparatus utilizing the method of the present invention.

FIG. 1 illustrates a schematic view of a hydraulic apparatus which employs the method according to the present invention. An engine 1 is operably connected by a crank shaft 2 through a clutch 3 with a shaft 5. The shaft 5 is an input shaft connected with a continuously variable transmission 4 (hereinafter referred to as CVT). The CVT 4 includes pulleys 6 and 7. The pulley 6 is a driving pulley mounted on the driving and input shaft 5 which is driven by the engine 1. The pulley 7 is a driven pulley, mounted on a driven and output shaft 8. The torque of the shaft 8 is outputted to wheels of a vehicle (not shown in drawings). A torque transmitting continuous V-belt 9 extends between the pulleys 6 and 7. The driving pulley 6 has a movable member 6a, which is axially displaced on and rotatable with the input shaft 5, and a fixed member 6b, which is fixed to and rotatable with the input shaft 5. The movable member 6a is axially displaced upon the input shaft 5 by the pressure exerted upon it by a hydraulic cylinder 6c. When the movable member 6a is axially displaced in a direction toward the fixed member 6b, the width defined between the members 6a and 6b is decreased. This results in an increased effective diameter of the driving pulley 6. As a result, the transmission RPM ratio "e", i.e., (the rotating speed of the driven pulley 7)/(the rotating speed of the driving pulley 6, $RPM_{out}/RPM_{in}$) is increased. The $RPM_{in}$ is governed by the engine RPM, represented by $RPM_e$.

Similarly, the driven pulley 7 has a movable member 7b, which is axially displaced on and rotatable with the output shaft 8, and fixed member 7a, which is fixed to and rotatable with the output shaft 8. The movable member 7b is axially displaced upon the output shaft 8 by the pressure exerted upon it by a hydraulic cylinder 7c. When the movable member 7b is axially displaced in a direction toward the fixed member 7a, the width defined between the members 7a and 7b is decreased. This results in an increased effective diameter of the driven pulley 7.

In order to minimize the amount of engine power consumed by a hydraulic fluid pump 14, the hydraulic pressure in the hydraulic cylinder 7c is controlled to be as small as possible while maintaining a necessary pressure to prevent the belt 9 from slipping while rotating around the driving pulley 6 and the driven pulley 7. The hydraulic pressure in the hydraulic cylinder 6c is varied to adjust the RPM ratio. The amount of pressure in the hydraulic cylinder 6c is designed to be smaller than that of the hydraulic pressure in the hydraulic cylinder 7c. However, even though the value of the hydraulic pressure supplied to the hydraulic cylinder 6c is less than the value of the hydraulic pressure supplied to the hydraulic cylinder 7c, the system is designed so that a greater overall hydraulic pressure is realized in the hydraulic cylinder 7c than in the hydraulic cylinder 6c, because the hydraulic cylinder 6c has the larger area acted upon by the hydraulic pressure than that of the hydraulic cylinder 7c. Hence, it is possible to obtain a RPM ratio of greater than or at least equal to one.

The CVT 4 is supplied with hydraulic fluid by the following procedure. A hydraulic fluid pump 14, driven by a motor, pumps hydraulic fluid from a reservoir 15 to a regulator valve 16. The regulator valve 16 controls the pressure supplied to an oil passage 18 by adjusting an amount of fluid drained from the system, thereby generating a specific line pressure $P_L$ in the hydraulic fluid passage 18. The regulator valve 16 supplies the line pressure $P_L$ through the oil passage 18 to the hydraulic cylinder 7c of the driven pulley 7 and to a flow control valve 19. The flow control valve 19 is a three port connection valve, and includes an inlet port 190 communicated with the passage 18, a drain port 192 communicated with a drain passage 70 and an outlet port 194 communicated through a hydraulic fluid passage 20 with the hydraulic cylinder 6c of the driving pulley 6. When the flow control valve 19 is in a first position 19A, the inlet port 190 communicates with the outlet port 194. When the flow control valve 19 is in a second position, shown by 19B, there is no communication between the three ports 190, 192 and 194 as shown in FIG. 1. Finally, when the flow control valve 19 is in a third position 19c, the outlet port 194 communicates with the drain port 192. A check valve 72 is provided on the drain passage 70. The check valve 72 only allows hydraulic fluid to flow in a single direction, from the flow control valve 19 to the hydraulic fluid reservoir 15.

A sensor 23 detects the rotating speed $RPM_{in}$ of the driving pulley 6. A sensor 24 detects the rotating speed $RPM_{out}$ of the driven pulley 7. An engine coolant temperature sensor 25 is mounted adjacent a cylinder block of the engine 1 and detects the temperature of the engine coolant. A throttle opening sensor 26 detects an amount that a throttle valve is opened which is varied in proportion to a stroke of an accelerator pedal 27, installed adjacent to a passenger seat 29. A sensor 28, mounted near the passenger seat 29, detects the position of a shift lever of the transmission. In the event that an automatic transmission is used, the sensor 28 detects the shift range of the transmission.

The signals detected by the foregoing sensors are inputted to an electronic control unit 100 (hereinafter referred to as ECU). The ECU 100 outputs control signals to the regulator valve 16 and the flow control valve 19.

When the hydraulic pressure in the hydraulic cylinder 7c of the movable member 7b of the driven pulley 7 increases, the movable member 7b is axially displaced upon the output shaft 8 toward the fixed member 7a. This axial displacement results in contact points between the driven pulley 7 and the belt 9 moving toward points which are positioned toward outer peripheral portions of the driven pulley 7. The amount of the line pressure $P_L$ is controlled so that it does not result in any significant amount of slip between the belt 9 and the driven pulley 7. When the hydraulic pressure in the hydraulic cylinder 6c of the driving pulley 6 increases, the movable member 6a of the driving pulley 6 is axially displaced upon the input shaft 5 toward the opposite member 6b. This axial displacement similarly results in contact points between the driving pulley 6 and the belt 9 moving toward points which are positioned toward outer peripheral portions on the driving pulley 6. Thus, the transmission RPM ratios between the driving and driven pulleys are controlled.

Figure 2:
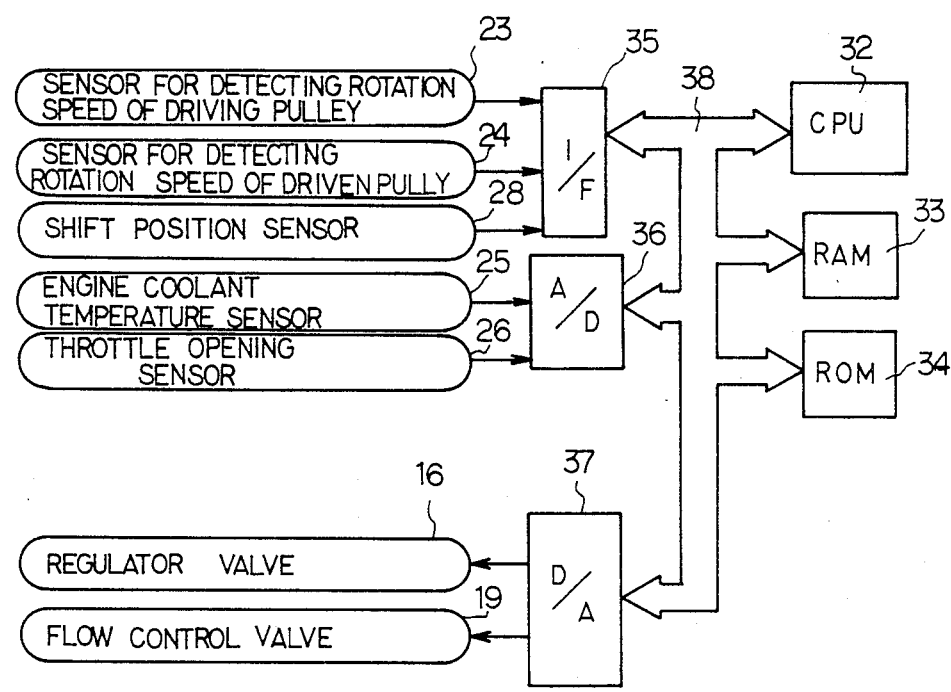
FIG. 2 is a circuit diagram of an electronic control unit employed in the present invention.

The ECU 100 controls the regulator valve 16 and the flow control valve 19 in accordance with the signals detected by the various sensors. FIG. 2 shows that the ECU 100 functions as a digital computer, and has a central processing unit 32 (hereinafter referred to as CPU) which carries out arithmetic and logic processing functions, an inter-face 35 (hereinafter referred to as I/F), an analog-digital converter 36 (hereinafter referred to as A/D), a random-access memory 33 (hereinafter referred to as RAM) which temporarily stores the calculated data of the CPU 32, a read-only memory 34 (hereinafter referred to as ROM) which stores a predetermined control program and arithmetic constants therein, and a digital-analog converter 37 (hereinafter referred to as D/A). They are connected by a common bus 38. An example of how the ECU 100 functions is given by the following. The I/F 35 receives an output signal from the sensor 23 corresponding to the rotating speed of the driving pulley 6 ($RPM_{in}$), an output signal from the sensor 24, corresponding to a rotating speed of the driven pulley 7 ($RPM_{out}$), and an output from the shift position sensor 28. The A/D 36 receives output signals from the engine coolant temperature sensor 25 and the throttle opening sensor 26. The CPU 32, a microprocessor, then compares the outputs received against any stored information, and issues an output to the D/A 37, which then subsequently outputs any appropriate instructions to the regulator valves 16 and the flow control valve 19.

The ROM memory means 34 works in conjunction with the CPU data processing means 32 in the following manner: The ROM 34 stores a data map, which includes data relating to a rate of changing a RPM ratio and the difference between the desired RPM of the driving pulley and the actual RPM of the driving pulley, for different vehicle velocities. The CPU data processing means 32 compares the actual operating conditions to the data stored in the ROM 34, and if appropriate, outputs signals which result in the regulator valve 16 and the flow control valve 19 being controlled.

Figure 3:
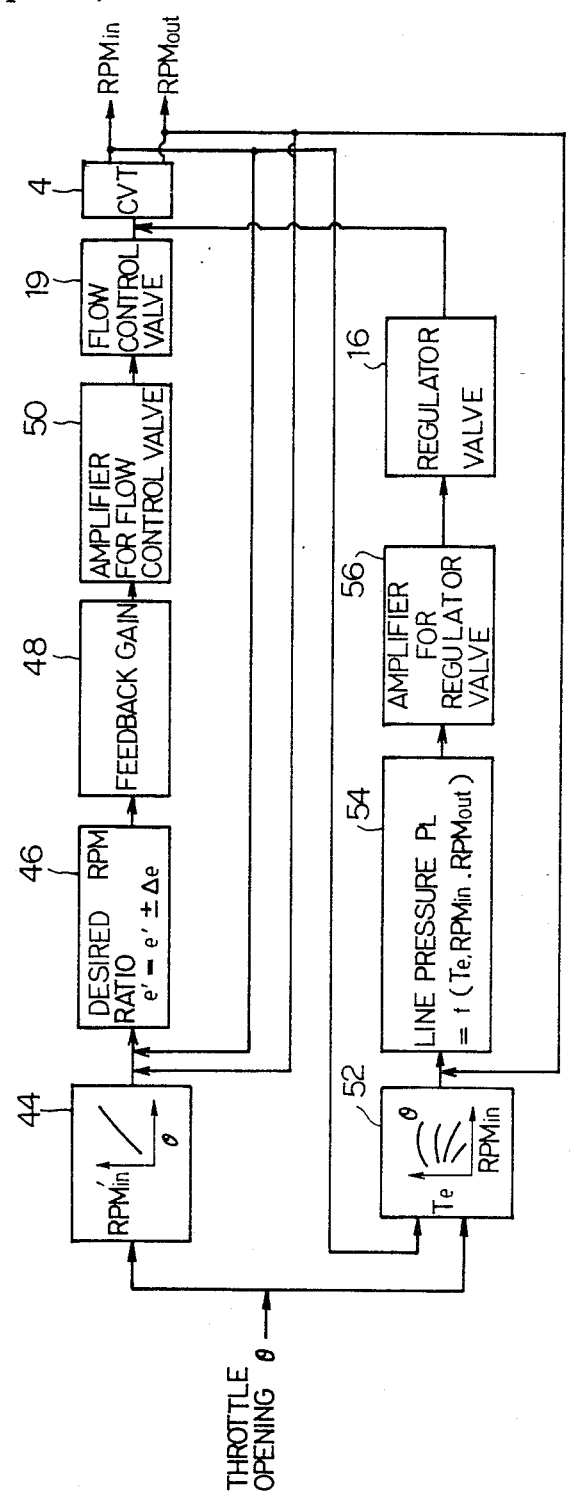
FIG. 3 is a block diagram showing a method for controlling a continuously variable transmission.

FIG. 3 is a block diagram illustrating a method for controlling the CVT 4. In a block 44, a desired rotating speed $RPM_{in}'$ of the driving pulley 6 is calculated in accordance with a detected throttle opening $\theta$. The requisite horsepower in the engine 1 is a function of the throttle opening $\theta$, and the desired engine speed, $RPM_e'$, is determined to have a value corresponding to a minimum amount of fuel consumption when the requisite horsepower for the engine 1 has been determined. The program proceeds to a block 46, wherein a desired RPM ratio $e'$ is increased or decreased by an amount $\Delta e$, until the actual rotating speed $RPM_{in}$, of the driving pulley 6 approaches the desired rotating speed, $RPM_{in}'$, calculated in accordance with the detected throttle opening $\theta$. When the actual rotating speed $RPM_{in}$ of the driving pulley 6 is less than the desired rotating speed $RPM_{in}'$, $-\Delta e$ is selected as a compensating amount. However, when the actual rotating speed $RPM_{in}$ of the driving pulley 6 is greater than the desired rotating speed $RPM_{in}'$, $+\Delta e$ is selected as a compensating amount. Additionally, when the actual rotating speed $RPM_{in}$, of the driving pulley 6 is equal to the desired rotating speed $RPM_{in}'$, no compensating amount is added to or subtracted from the actual rotating speed. After adjusting the actual rotating speed, the program proceeds to a block 48, wherein a feedback gain is calculated from the difference between the desired RPM ratio $e'$ and the actual RPM ratio $e$. The feedback gain is transmitted through an amplifier 50 to the flow control valve 19. Thus, the RPM ratio e is controlled.

In a block 52, an engine torque $T_e$ is determined by examining the rotating speed of the driving pulley 6, $RPM_{in}$, as controlled by the flow control valve 19, and the throttle opening $\theta$. The program then proceeds to a block 54. In the block 54, a line pressure $P_L$ is calculated as a function of a transmitting torque of the CVT 4. The transmitting torque of the CVT 4 is a function of the engine torque $T_e$, the rotating speed $RPM_{in}$ of the driving pulley 6, and the rotating speed $RPM_{out}$ of the driven pulley 7. The output signal of the block 54 is inputted through an amplifier 56 to the regulator valve 16. The regulator valve 16 controls the line pressure $P_L$ supplied into the hydraulic cylinder 7c of the driven pulley 7, as well as the line pressure supplied to the flow control valve 19, thus controlling the effective diameter of the driving pulley 6 through the flow control valve 19 and the driven pulley 7.

Figure 4:
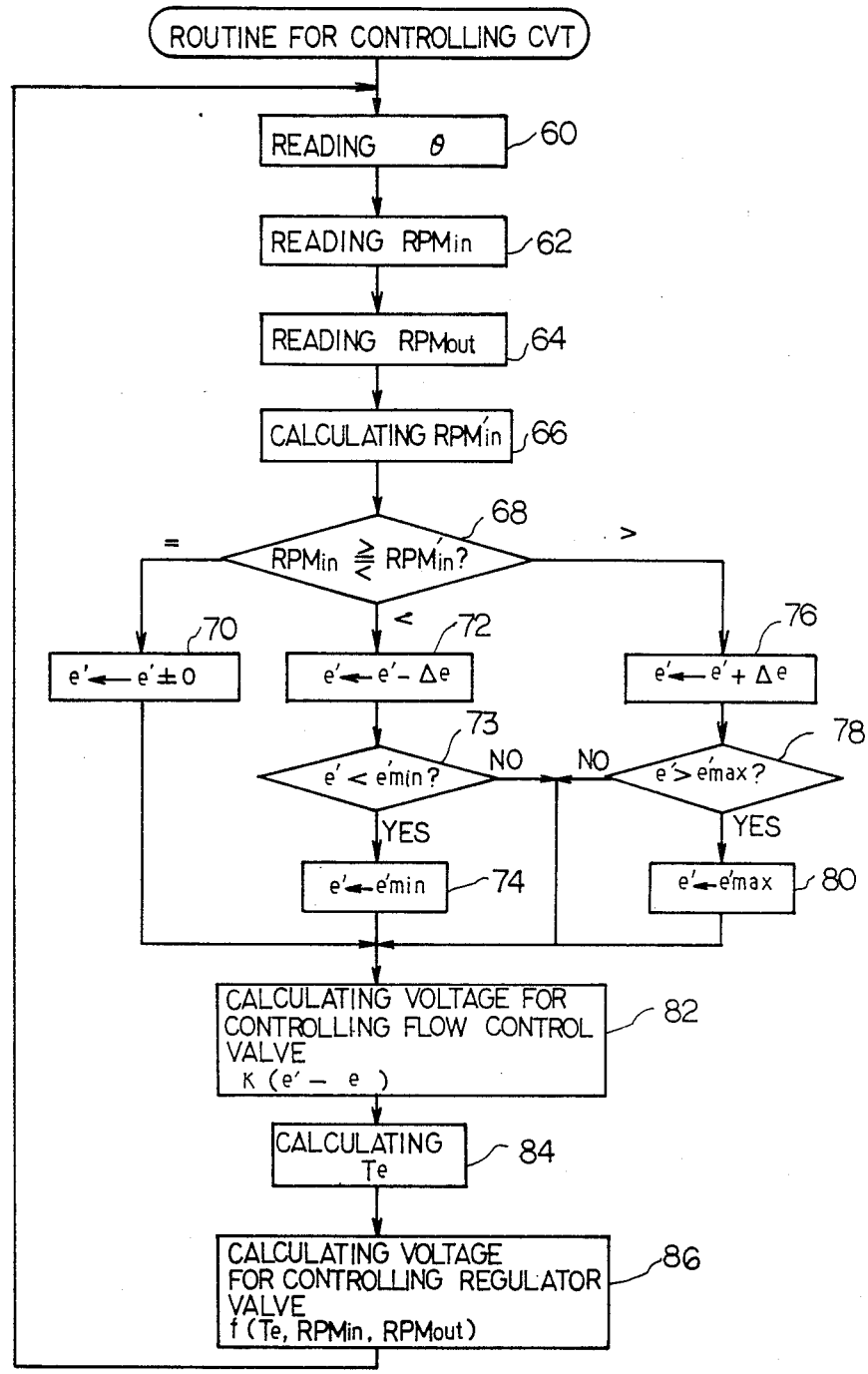
FIG. 4 is a flow chart which corresponds to the block diagram shown in FIG. 3.

FIG. 4 shows a flow chart of the routine employed in the block diagram shown in FIG. 3. In a step 60, the throttle opening $\theta$ is read. The program proceeds to a step 62, wherein the rotating speed $RPM_{in}$ of the driving pulley 6 is read. The program proceeds to a step 64, wherein the rotating speed $RPM_{out}$ of the driven pulley 7 is read. The program proceeds to a step 66, wherein the desired rotating speed $RPM_{in}'$ of the driving pulley 6 is calculated. The program then proceeds to a step 68. In the step 68, the determination is made of whether the rotating speed of the driving pulley 6, $RPM_{in}$, is greater than, less than or equal to the desired rotating speed $RPM_{in}'$, of the driving pulley 6. When the rotating speed $RPM_{in}$ of the driving pulley 6 is equal to the desired rotating speed $RPM_{in}'$, the program proceeds to a step 70. In the step 70, the desired RPM ratio $e'$ is not adjusted. When the rotating speed $RPM_{in}$ of the driving pulley 6 is less than the desired rotating speed $RPM_{in}'$, the program proceeds to a step 72. In the step 72, the desired RPM ratio $e'$ is decreased by an amount $e$. The program then proceeds to a step 73, wherein the determination is made of whether the desired RPM ratio $e'$ is less than a predetermined minimum desired RPM ratio $e'min$. If the desired RPM ratio $e'$ is less than the minimum desired RPM ratio $e'min$, then the program proceeds to the step 74, wherein the desired RPM ratio $e'$ is set equal to the minimum desired RPM ratio $e'min$. However, when the rotating speed $RPM_{in}$ of the driving pulley is greater than the desired rotating speed $RPM_{in}'$, the program proceeds to a step 76. In the step 76, the desired RPM ratio $e'$ is increased by an amount $\Delta e$. The program then proceeds to a step 78, wherein the determination is made of whether the desired RPM ratio $e'$ is greater than a predetermined maximum desired RPM ratio $e'max$. If the desired RPM ratio $e'$ is greater than the maximum desired RPM ratio $e'max$, then the program proceeds to the step 80, wherein the desired RPM ratio $e'$ is set equal to the maximum desired RPM ratio $e'max$.

The program then proceeds to a step 82, wherein an amount of voltage needed to control the flow control valve 19 is calculated by using the equation $K(e'-e)$, where K is a constant and e is the actual RPM ratio. The program then proceeds to a step 86. In the step 86, an amount of voltage needed to control the regulator valve 16 is calculated as a function of the engine torque $T_e$, the rotating speed of the driving pulley 6, $RPM_{in}$, and the rotating speed of the driven pulley 7, $RPM_{out}$.

Figure 5:
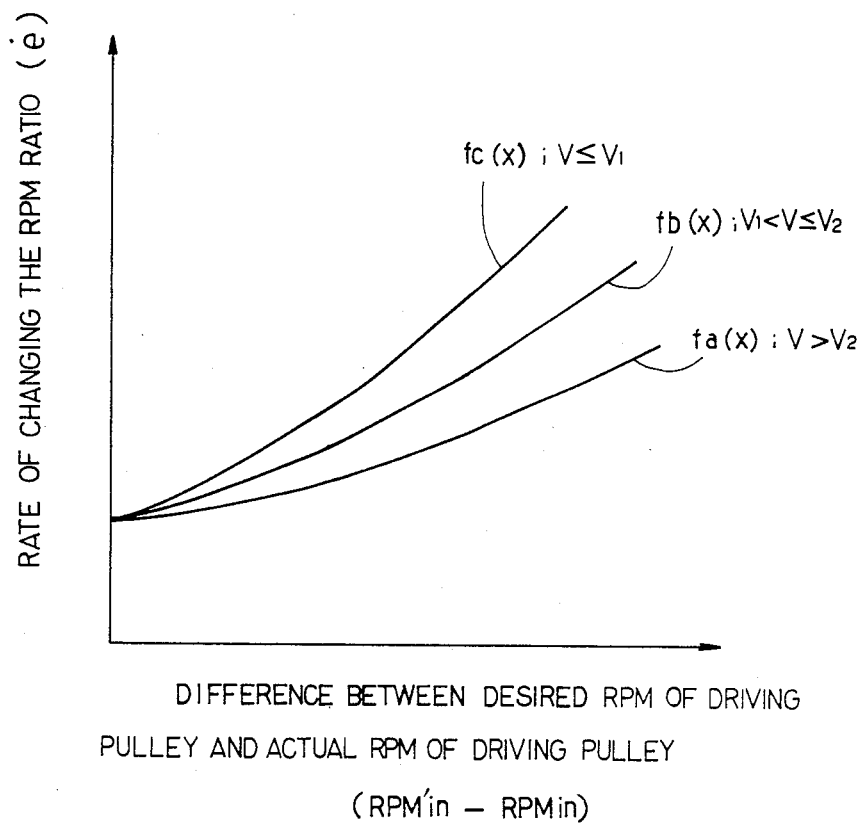
FIG. 5 is a graph which illustrates a relationship between the difference between the desired RPM of the driving pulley and the actual RPM of the driving pulley ($RPM_{in}'-RPM_{in}$) and the rate of changing the RPM ratio ė.

FIG. 5 shows a relationship between the rate of changing the RPM ratio $\dot{e}$ and the difference between the desired RPM of the driving pulley and the actual RPM of the driving pulley ($RPM_{in}' - RPM_{in}$). The rate of changing the RPM ratio $\dot{e}$ is defined as $|de/dt|$, where "t" represents time. The various relationships shown in FIG. 5 can be used in the step 46 of FIG. 3 or the steps 72 and 76 of FIG. 4. The rate of changing the RPM ratio $\dot{e}$ increases as the difference between $RPM_{in}'$ and $RPM_{in}$ increases. Additionally, the rate of changing the RPM ratio $\dot{e}$ increases as the velocity of the vehicle decreases. For example, when the actual vehicle velocity V is less than a first predetermined velocity $V_1$, a relationship between the rate of changing the RPM ratio and the difference between $RPM_{in}'$ and $RPM_{in}$ is represented by $f_c(x)$. When the actual vehicle velocity V is greater than the first predetermined vehicle velocity V1 and less than ar equal to a second predetermined vehicle velocity V2, (i.e. $V1 < V \leq V2$), a second relationship $f_b(x)$ represents the relationship between the rate of changing the RPM ratio and the difference between $RPM_{in}'$ and $RPM_{in}$ and the second predetermined vehicle velocity V2 is greater than the first predetermined vehicle velocity $V_1$. Further, when the actual vehicle velocity V is greater than the second predetermined vehicle velocity V2, a third relationship between the rate of changing the RPM ratio and the difference between $RPM_{in}'$ and $RPM_{in}$ is represented by $f_a(x)$.

At all points where the difference between $RPM_{in}'$ and $RPM_{in}$ is greater than zero, $f_a(x)$, $f_b(x)$ and $f_c(x)$ satisfy the following inequality:

$$f_c(x) < f_b(x) < f_a(x)$$

When the acceleration of a vehicle results in the difference between $RPM_{in}'$ and $RPM_{in}$ being large, and the actual vehicle velocity is low, such as less than V1, a point from the plurality of points represented by the relationship $f_c(x)$ is chosen to determine the rate of changing the RPM ratio. This permits a vehicle to accelerate rapidly. However, if the difference between $RPM_{in}'$ and $RPM_{in}$ is small, and the velocity of the vehicle is large, such as greater than V2, a point from the plurality of points represented by the relationship $f_a(x)$ is chosen to determine the rate of changing the RPM ratio. This results in a much smaller acceleration of the vehicle and a much better fuel consumption rate. Additionally, when the velocity of the vehicle is greater than V1 but less than or equal to V2, a point from the plurality of points represented by the relationship $f_b(x)$ is chosen to determine the rate of changing the RPM ratio.

Figure 6:
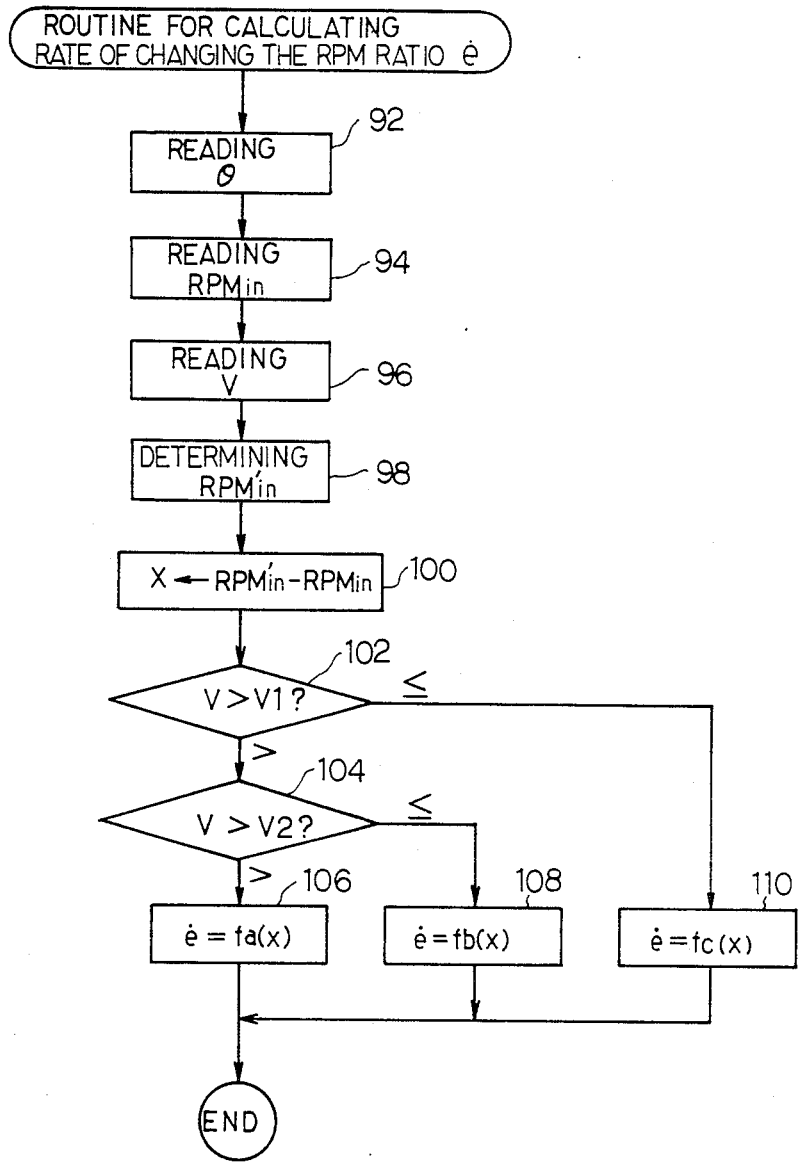
FIG. 6 is a flow chart which illustrates a routine for calculating a rate of changing the RPM ratio ė.

FIG. 6 shows a flow chart which illustrates a routine for calculating a rate of changing the RPM ratio ė, which can be used in step 46 of FIG. 3 and steps 72 and 76 of FIG. 4. In a step 92, the amount that a throttle valve is opened is detected. The program proceeds to a step 94, wherein the rotating speed $RPM_{in}$ of the driving pulley 6 is detected. The rotating speed $RPM_{in}$ is equal to the engine speed $RPM_e$. The program proceeds to a step 96. In the step 96, the actual velocity of the vehicle is detected. The program proceeds to a step 98, wherein the desired rotating speed $RPM_{in}'$ of the driving pulley 6 is determined in accordance with the amount $\theta$ that a throttle valve is opened. The program then proceeds to a step 100. In the step 100, $(RPM_{in}' - RPM_{in})$ is substituted for the value X. The program proceeds to a step 102, wherein the determination is made of whether the actual vehicle velocity V is greater than the first predetermined vehicle velocity V1. If the actual vehicle velocity is less than or equal to $V_1$, than the rate of changing the RPM ratio ė is determined in accordance with $f_c(x)$ and $(RPM_{in}' - RPM_{in})$ in the step 110. However, if the actual vehicle velocity is greater than $V_1$, the program proceeds to a step 104, wherein the determination is made of whether the actual vehicle velocity is greater than the second predetermined vehicle velocity $V_2$. If the actual vehicle velocity is less than or equal to the second predetermined vehicle velocity $V_2$, then the rate of changing the RPM ratio ė is determined in accordance with $f_b(x)$ and $(RPM_{in}' - RPM_{in})$ in the step 108. However, if the actual vehicle velocity is greater than the second predetermined vehicle velocity $V_2$, then the rate of changing the RPM ratio ė is determined in accordance with $f_a(x)$ and $(RPM_{in}' - RPM_{in})$.

While the present invention has been described in its preferred embodiments, it is to be understood that the invention is not limited thereto, and may be otherwise embodied within the scope of the following claims.

What is claimed is:

1. A method for controlling a rate of changing an RPM ratio in a continuously variable transmission connected to an engine in a vehicle, the transmisssion having a driving pulley mounted on an input shaft, the driving pulley comprising a fixed member and a movable member, the movable member being actuated by an hydraulic cylinder to form a V-shaped opening between the movable member and the fixed member, a driven pulley mounted on an output shaft, the driven pulley comprising another fixed member and another movable member, said another movable member being similarly actuated by another hydraulic cylinder supplied with a line pressure to form another V-shaped opening between said another movable member and said another fixed member and an endless belt member spanning the pulleys so that an effective diameter of the pulleys can be varied at different rates with regard to each other so that different speed ratios can be obtained, comprising the steps of:

detecting operating parameters of the engine;

calculating a desired rotating speed of the driving pulley as a function of at least one of the detected operating parameters;

calculating a difference between said desired rotating speed of the driving pulley and an actual rotating speed of the driving pulley;

comparing an actual velocity of the vehicle with a first predetermined vehicle velocity and when said actual vehicle velocity is less than or equal to said first predetermined vehicle velocity, a rate of changing said RPM ratio is selected from a first plurality of rates of change of said RPM ratio and when said actual vehicle velocity is greater than said first predetermined vehicle velocity comparing said actual vehicle velocity with a second predetermined vehicle velocity, and when said actual vehicle velocity is less than or equal to said second predetermined vehicle velocity, a rate of changing said RPM ratio is selected from a second plurality of rates of change of said RPM ratio and when said actual vehicle velocity is greater than said second predetermined vehicle velocity said rate of changing said RPM ratio is selected from a third plurality of said rates of change of RPM ratio.

2. The method of claim 1, wherein the detected operating parameters of the engine comprise: an amount of opening of a throttle valve, an actual rotating speed of the driving pulley, and the velocity of the vehicle.

3. The method of claim 1, wherein the desired rotating speed of the driving pulley is calculated in accord with at least one of said detected operating parameters of the engine.

4. The method of claim 1, wherein the predetermined rates of change of said RPM ratio increase as the difference between said desired rotating speed of the driving pulley and said actual rotating speed of the driving pulley increase.

5. The method of claim 4, wherein the increase in the rates of change of said RPM ratio is non-linear.

6. The method of claim 1, wherein said actual velocity of the vehicle is compared with two predetermined vehicle velocities.

7. The method of claim 1, wherein said rate of change of said RPM ratio increases according to a decrease in the actual velocity of the vehicle.

8. The method of claim 1, wherein said first plurality of rates of change are greater than said second plurality of said rates of change.

9. The method of claim 8, wherein said second plurality of rates of change of said RPM ratio are greater than said third plurality of said rates of change of said RPM ratio.

10. A method for controlling a rate of changing an RPM ratio in a continuously variable transmission connected to an engine in a vehicle, the transmission having a driving pulley mounted on an input shaft, the driving pulley comprising a fixed member and a movable member, the movable member being actuated by an hydraulic cylinder to form a Vshaped opening between the movable member and the fixed member, a driven pulley mounted on an output shaft, the driven pulley comprising another fixed member and another movable member, said another movable member being similarly actuated by another hydraulic cylinder supplied with a line pressure to form another V-shaped opening between said another movable member and said another fixed member and an endless belt member spanning the pulleys so that an effective diameter of the pulleys can be varied at different rates with regard to each other so that different speed ratios can be obtained, comprising the steps of:

detecting an amount of opening of a throttle valve;
  detecting an actual rotating speed of the input shaft;
  detecting an actual velocity of the vehicle;
  calculating a desired rotating speed of the driving pulley as a function of said detected amount of opening of said throttle valve;
  calculating a difference between said desired rotating speed of the driving pulley and an actual rotating speed of the driving pulley;
  comparing an actual vehicle velocity of the vehicle with a first predetermined vehicle velocity and when said actual vehicle velocity is less than or equal to said first predetermined vehicle velocity, a rate of changing said RPM ratio is selected from a first plurality of rates of change of said RPM ratio and said actual vehicle velocity is compared with a second predetermined vehicle velocity and when said actual vehicle velocity is less than or equal to said second predetermined vehicle velocity, a rate of changing said RPM ratio is selected from a second plurality of rates of change of said RPM ratio and said rate of changing said RPM ratio is selected from a third plurality of said rates of change of RPM ratio when said actual vehicle velocity is greater than said second predetermined vehicle velocity;
  said first, second and third sets of RPM ratios being predetermined as a function of said at least one predetermined vehicle velocity and said calculated difference between said desired rotating speed of the driving pulley and said actual rotating speed of the driving pulley.

11. The method of claim 10, wherein the predetermined rates of change of said RPM ratio increase as the difference between said desired rotating speed of the driving pulley and said actual rotating speed of the driving pulley increase.

12. The method of claim 11, wherein the increase in the rates of change of said RPM ration is non-linear.

13. The method of claim 10, wherein said first plurality of rates of change are greater than said second plurality of said rates of change.

14. The method of claim 13, wherein said second plurality of rates of change of said RPM ratio are greater than said third plurality of said rates of change of said RPM ratio.

* * * * *